June 30, 1936.  W. A. TRESCOTT  2,045,887
PACKING TERMINAL FOR FRUIT SORTING MACHINES
Filed March 30, 1933
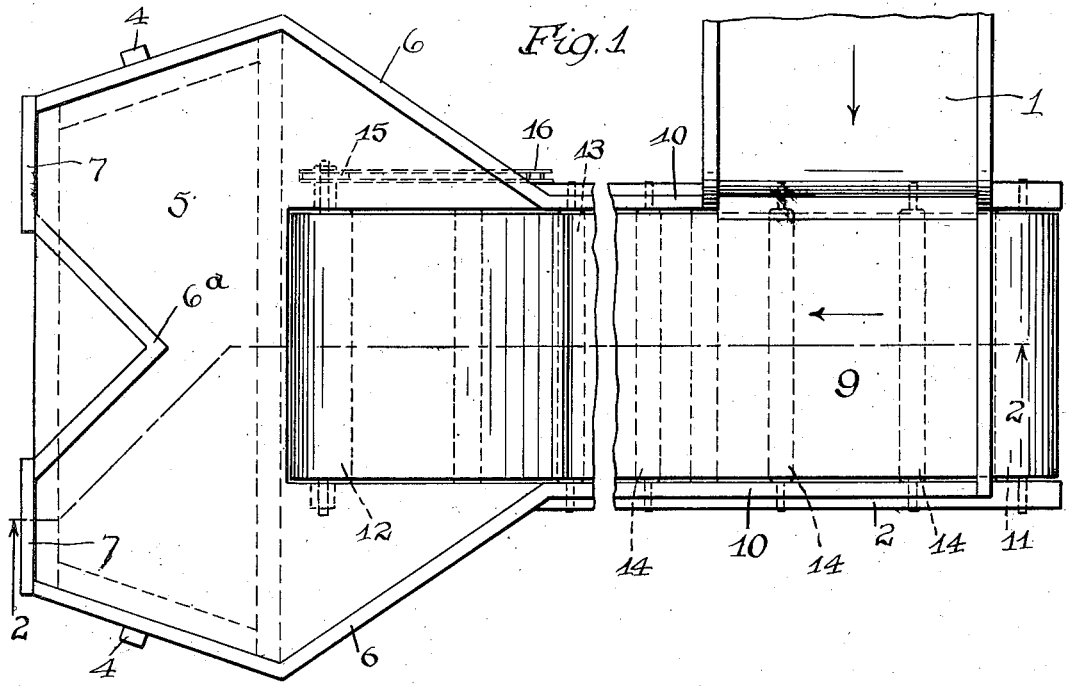
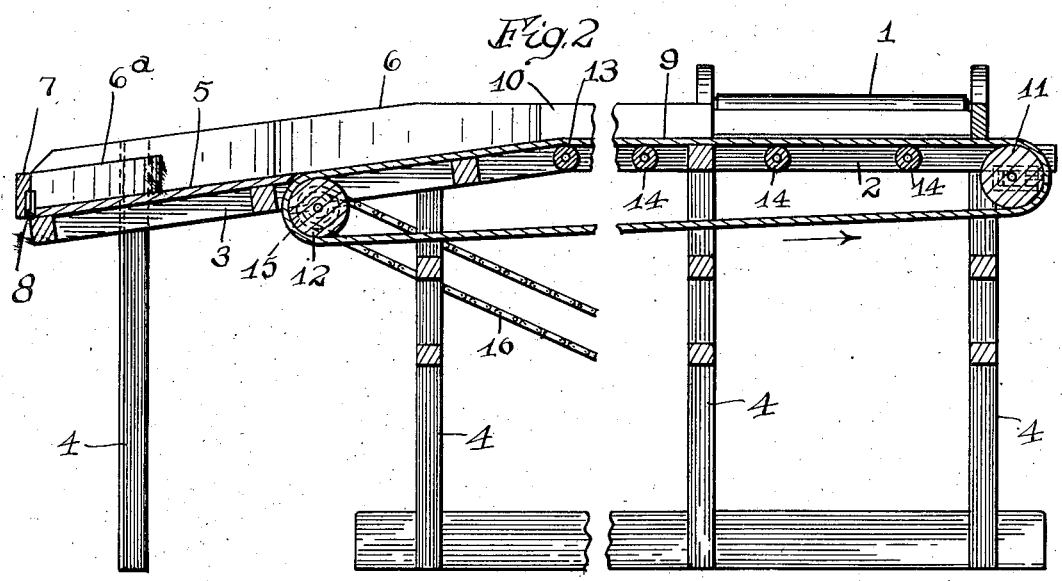
INVENTOR
Willis A. Trescott
BY
HIS ATTORNEY Patented June 30, 1936

2,045,887

UNITED STATES PATENT OFFICE 2,045,887

PACKING TERMINAL FOR FRUIT SORTING MACHINES

Willis A. Trescott, Fairport, N. Y., assignor to The Trescott Company, Inc., Fairport, N. Y., a corporation of New York Application March 30, 1933, Serial No. 663,557

2 Claims. (Cl. 226—129)

My present invention relates to fruit handling apparatus, such as sorters, graders and cleaners, and more particularly to the terminal facilities thereof, and it has for its general object to provide a simple, durable and convenient form of packing table, with the assistance of which the fruit is gathered into containers for shipment or storage. The improvements are directed in part toward providing such a table that will handle the fruit rapidly in large volume with a minimum of effort on the part of the packer.

To these and other ends, the invention resides in certain improvements and combinations of parts, all as will be hereinafter more fully described, the novel features being pointed out in the claims at the end of this specification.

In the drawing:

Fig. 1 is a top plan view of such a fruit machine discharge terminal provided with a packing table constructed in accordance with and illustrating one embodiment of my invention, and Fig. 2 is a vertical section therethrough taken substantially on the line 2—2 of Fig. 1.

Similar reference numerals throughout the several views indicate the same parts.

Referring more particularly to the drawing, the fruit handling apparatus to be equipped with my improved packing table is indicated by the delivery chute or conveyor 1 shown broken away and from which it will be assumed a continuous stream of apples or other fruit is delivered from the direction indicated by the arrow, this being, in the present instance, a side delivery table such as is provided to take care of each grade of sized fruit in a multiple machine. The table comprises an upper substantially horizontal frame portion 2 adjacent to the chute 1 united with or continuing into an inclined frame portion 3 all supported on suitably braced legs 4. The inclined frame carries an expanse of fixed surface provided by a rigid table top portion 5 enclosed by side rails 6 and of the shape shown in Fig. 1, namely, wide laterally at the center with the side rails converging in both directions, upwardly toward the horizontal frame 2 and downwardly to a pair of gateways closed by drop gates 7 hinged at 8. These gateways are separated by an intermediate reentrant triangular construction 6ª of the side rails 6 to generally divert descending fruit so that it is divided between the gateways.

The top of the horizontal portion of the table, represented by the frame portion 2, is traversed by and, in the present instance, its surface is entirely constituted by, a canvas or similar belt 9 that initially takes the fruit at one end as it is delivered from the chute or conveyor 1 and carries it between side rails 10 in the direction of the arrow. The belt is endless, running between a roll 11 at the last mentioned end and a roll 12 located substantially in the center of the inclined rigid table top 5.

Adjacent to the last mentioned roll, the belt or apron 9 lies in the plane of and constitutes a continuation of the fixed table surface 5 which is cut away to form a well for this purpose. A guide roller 13 defines the break between the relatively angular table surfaces at their junction and supports the upper reach or conveying surface of the belt together with other idler rollers 14. All the rolls are supported in suitable bearings in the frames 2 and 3 and roll 12 is a driven roll, its extended shaft being provided with a sprocket 15 and chain 16 running to any suitable source of power. The device is operated and used as follows:

The receiving barrels or other packing receptacles are placed beneath the gates 7 which are dropped down and as the fruit is spilled from the chute 1 on to the horizontal table portion of the belt 9 it is conveyed over the break 13 and spilled upon the inclined table surface where the operator or packer directs them generally into the receptacles by hand in order to attain some semblance of regularity in the packing and insure a compact disposition of the fruit therein. The inclination of the table 5, the surface of which is partly fixed and partly moving, should be about that shown in the drawing, that is, slight enough to slow the movement of the fruit thereon yet abrupt enough to continue their feeding progress. These packing tables are made rather large and apples, particularly, because of their relatively flat ends, are disposed to seek early lodgement and not roll as far as the gates. It has hitherto, in applicant's experience, been necessary for him to use a stick or other implement in the manner of a croupier to dislodge such apples and force them toward him. With my device, this is not necessary because the central upper portion of the inclined packing and inspection table has a traveling or agitating surface at the point where the apples are most liable to choke and the result is that the apples continuously flow to the foot of the grade within easy reach of the packer so that there is no loss of time in the packing and no diversion or spilling resulting from jammed collections of fruit.

An additional advantage flowing from this construction results from the fact that the fruit are conveyed within packing reach gently, reducing the extent to which they roll, fall or are tumbled about, thereby avoiding bruising contacts.

I claim as my invention:

1. In a packing terminal for fruit sorting machines, the combination with a delivery chute, of a table having a substantially horizontal receiving portion in communication with the chute and a relatively inclined packing portion, the inclination of the latter being slight enough to slow the movement of the fruit thereon yet abrupt enough to continue their feeding progress, and a conveying and agitating belt extending across the receiving portion and partly across the packing portion, said packing portion being provided with marginal rails for limiting the dispersion of the rolling fruit and formed with divided filling gates at the lower end.

2. In a packing terminal for fruit sorting machines, the combination with a delivery chute, of a table having a substantially horizontal receiving portion in communication with the chute and a relatively inclined enclosed packing portion terminating at the lower end in filling gateways, and a conveying and agitating belt extending across the receiving portion and partly across the packing portion toward the gateways, there being provided a guide roller for the belt at the break between the two table portions.

WILLIS A. TRESCOTT.